United States Patent
Sadot et al.

(10) Patent No.: US 7,873,012 B2
(45) Date of Patent: Jan. 18, 2011

(54) ROAMING WIRELESS CLIENT COMMUNICATION

(75) Inventors: Emek Sadot, Ocean, NJ (US); Leigh Michael Chinitz, Wellesley, MA (US); Timothy Wilson, Rolling Meadows, IL (US)

(73) Assignees: Avaya Communication Israel Ltd., Tel Aviv (IL); Proxim Inc., Sunnyvale, CA (US); Motorola Inc., Schaumburg, IL (US)

( * ) Notice: Subject to any disclaimer, the term of this patent is extended or adjusted under 35 U.S.C. 154(b) by 1591 days.

(21) Appl. No.: 10/899,418

(22) Filed: Jul. 26, 2004

(65) Prior Publication Data

US 2006/0018281 A1   Jan. 26, 2006

(51) Int. Cl.
*H04Q 7/00* (2006.01)
(52) U.S. Cl. .................. 370/331; 370/332; 370/352; 455/432.1; 455/435.1; 455/435.2
(58) Field of Classification Search ............... 455/422.1, 455/432.1, 435.1, 435.2, 436; 370/331, 332, 370/352
See application file for complete search history.

(56) References Cited

U.S. PATENT DOCUMENTS

| | | | |
|---|---|---|---|
| 5,920,699 A | 7/1999 | Bare | |
| 6,473,413 B1* | 10/2002 | Chiou et al. | 370/331 |
| 6,775,276 B1* | 8/2004 | Beser | 370/389 |
| 6,990,343 B2* | 1/2006 | Lefkowitz | 455/436 |
| 7,212,505 B2* | 5/2007 | Saint-Hila et al. | 370/328 |
| 2004/0097232 A1* | 5/2004 | Haverinen | 455/436 |
| 2004/0208187 A1* | 10/2004 | Mizell et al. | 370/401 |
| 2005/0111380 A1* | 5/2005 | Adrangi et al. | 370/254 |
| 2005/0195780 A1* | 9/2005 | Haverinen et al. | 370/338 |

FOREIGN PATENT DOCUMENTS

| | | |
|---|---|---|
| EP | 05 25 45 86 | 10/2005 |
| JP | 11289278 A | 10/1999 |
| WO | WO97/32419 | 9/1997 |
| WO | WO 03/024128 A1 | 3/2003 |
| WO | WO 03/034683 A1 | 4/2003 |

OTHER PUBLICATIONS

Edwards, Bob; "ProxyARP Subnetting Howto", Retrieved from Internet: http://www.faqs.org/docs/Linux-mini/Proxy-ARP-Subnet.html; downloaded on Sep. 24, 2003; pp. 1-6.

Weis, David; "Proxy ARP with Linux", Retrieved from Internet: http://www.sjdjweis.com/linux/proxyarp/; downloaded on Sep. 24, 2003; pp. 1-5.

(Continued)

*Primary Examiner*—Temica M Beamer
(74) *Attorney, Agent, or Firm*—Joseph B. Ryan; Jason Paul DeMont; Wayne S. Breyer

(57) ABSTRACT

A method of reducing tunneling in a wireless packet network. The method includes defining a home access point for a client station, determining that the client station is being serviced by an access point different from the home access point, deciding if the client station should change its home access point to the access point from which the client station receives service and initiating a change of the home access point of the client station, if so decided.

30 Claims, 2 Drawing Sheets

OTHER PUBLICATIONS

Y. Chen et al., "Dynamic Home Agent Reassignment in Mobile IP," IEEE, pp. 44-48, 2002.
G. Matar, "CA Application No. 2,511,637 Office Action Apr. 24, 2008",, Publisher: CIPO, Published in: CA.
G. Matar, "CA Application No. 2,511,637 Office Action May 25, 2009", Publisher: CIPO, Published in: CA.
"EP Application No. 05 254 586.0 Office Action Jan. 15, 2008",, Publisher: EPO, Published in: EP.
"EP Application No. 05 254 586.0 Office Action Dec. 21, 2006",, Publisher: EPO, Published in: EP.
Goller, W., "EP Application No. 05 254 586.0 Office Action Jun. 6, 2006",, Publisher: EPO, Published in: EP.
Goller, W., "EP Application No. 05 254 586.0 Search Report Oct. 26, 2005",, Publisher: EPO, Published in: EP.
H. Tanaka, "JP Application No. 2005-215544 Office Action May 25, 2009",, Publisher: JP, Published in: JP.
Dae-Seong Kim, "KR Application No. 10-2005-0067314 Office Action Jun. 27, 2008",, Publisher: KIPO, Published in: KR.
Matar, G., "CA Application No. 2,511,637 Office Action Jan. 21, 2010",, Publisher: CIPO, Published in: CA.
Pettersson, Hans, "EP Application No. 05254586.0-1525 Office Action Jan. 15, 2010",, Publisher: EPO, Published in: EP.
"EP Application No. 05254586.0-1525/1622338 Office Action Nov. 13, 2009",, Publisher: EPO, Published in: EP.
"EP Application No. 05254586.0 Office Action Feb. 19, 2010",, Publisher: EPO, Published in: EP.

* cited by examiner

ROAMING WIRELESS CLIENT COMMUNICATION

FIELD OF THE INVENTION

The present invention relates to wireless packet based networks and in particular to communicating with roaming clients in a wireless packet based network.

BACKGROUND OF THE INVENTION

In wireless packet networks, a wireless client (STA) receives service from access points (AP). The access points (APs) serve as an interface between the wireless clients (STAs) and a distribution network. When a client STA initially connects to the network, the client (STA) searches for an AP from which to receive service. The STA finds an appropriate AP and associates with this AP. Generally, the client (STA) is assigned an identity (e.g., an IP address) according to the AP with which it is first associated. For example, using the DHCP protocol the client (STA) is assigned an IP address associated with the access point (AP) it uses when transmitting a DHCP request for an IP address. The access point (AP) that corresponds to the assigned IP address is generally referred to as the home access point (HAP) of the client. The home AP is generally the first AP 130 with which the STA 140 connects at start up or entrance to a specific area, although the home AP may be determined otherwise, for example may be pre-configured.

If the wireless client (STA) roams to a different location, the client (STA) may disassociate from the home access point (HAP) and associate with a different access point (AP). Generally, the client (STA) maintains its original IP address, while receiving service from the different access point (AP). If the other access point (AP) belongs to a different LAN (local area network) or virtual LAN, data transmitted or received by the client (STA) is transferred via the home access point (HAP), because the STA's address is associated with this access point (AP). The additional data transmission required to transfer the data to and from the new access point (AP) is referred to as tunneling. If many clients (STAs) are tunneling data, or if tunneling clients (STAs) transfer large amounts of data, the tunneling loads the network and can substantially impede the quality of service of the network.

SUMMARY OF THE INVENTION

An aspect of an embodiment of the invention relates to reducing tunneling of packets over a network. A wireless client station (STA) that roams out of range of its original home access point (HAP) and hence re-associates with a new access point, attempts to change its home access point (HAP) to the new access point with which it is currently associated, in order to prevent tunneling.

In an exemplary embodiment of the invention, a wireless client station (STA) that associates with a new access point, determines if it is conducting an important communication session that will be terminated if the STA's home access point changes (e.g., due to an address change of the STA, resulting from the change in the home AP). Such an important session is referred to herein as a non-interruptible session. If the wireless client (STA) does not have any non-interruptible sessions, the AP associated with the wireless client (STA) becomes the home access point of the client, optionally even if this requires interrupting one or more interruptible sessions.

In some embodiments of the invention, sessions are defined as non-interruptible based on user configurable preferences, for example based on the application of the session or duration of the session. In an exemplary embodiment of the invention, a session that just started (e.g., the first few seconds) is considered non-interruptible. Optionally, a user can select to interrupt all connections or not to interrupt any connections.

In some embodiments of the invention, sessions are defined as non-interruptible based on network preferences such as network load or the relative overhead added by continuing the application with tunneling (e.g., according to the expected bandwidth utilization of the application) in contrast to reconnecting the session.

In some embodiments of the invention, the determination of whether to change the home access point (HAP) is performed at the first instance when it is determined that a wireless client (STA) is to be re-associated with a new access point (AP). Alternatively or additionally, a wireless client (STA) that is tunneling checks periodically if it can update its home access point (HAP) to the current access point (AP). In some embodiments of the invention, a wireless client station (STA) that is tunneling checks if it should update its home access point (HAP) to the current access point (AP) when ending a communication session or before starting a new session.

There is therefore provided in accordance with an exemplary embodiment of the invention, a method of reducing tunneling in a wireless packet network, comprising defining a home access point for a client station, determining that the client station is being serviced by an access point different from the home access point, deciding if the client station should change its home access point to the access point from which the client station receives service, and initiating a change of the home access point of the client station, if so decided.

Optionally, the deciding if to change the home access point is performed by the client station or by the access point servicing the client station. Optionally, the determining, deciding and initiating are performed automatically without human intervention.

Optionally, the initiating of the change comprises transmitting a DHCP request, in some cases with a field having a value indicating that the home access point could or should be changed. Optionally, a network element along the path from the client station to a DHCP server chooses the path in which the DHCP request is forwarded to the DHCP server responsive to the value of the field indicating whether the home access point could or should be changed. Optionally, the network element comprises an access point, a layer 2 switch, a layer 3 switch and/or a wireless network element.

Optionally, the DHCP request is transmitted responsive to a change in the access point servicing the client station, regardless of the deciding, but the contents of at least one field of the DHCP request is set responsive to the deciding.

Optionally, the initiating is performed by stopping the service of the client station, in order to force the client station to re-connect to the network. Optionally, the determining is performed responsive to a change in the access point servicing the client station and/or in the network topology. Optionally, the determining is performed periodically. Optionally, the deciding is repeated after a predetermined time if the decision was that the home access point of the client station should not change. Optionally, the deciding is performed at least partially based on the traffic load in the network. Optionally, the deciding is performed at least partially based on an analysis of the communication sessions of the client station.

Optionally, the deciding includes determining to perform the re-associating if none of the sessions of the client station are non-interruptible. Optionally, the deciding includes determining to perform the change in the home access point if the client station does not have non-idle sessions. Optionally, the deciding includes determining to perform the change in the home access point if the client station does not have active real time sessions.

Optionally, the change in the home access point causes all the communication sessions of the client station to be disconnected.

There is further provided in accordance with an exemplary embodiment of the invention, a client station, comprising a wireless transceiver adapted to connect to access points, a connection control unit adapted to establish a connection with a specific access unit, and a processor adapted to decide whether to change the home access point of the client station, and to transmit a message indicating that the home access point of the client station should be changed, if so decided.

Optionally, the message indicating that the home access point should or could be changed comprises a DHCP request having a zero value in its ciaddr field. Alternatively, the message indicating that the home access point should or could be changed comprises a DHCP request having an indication in a field other than the ciaddr field. In some embodiments of the invention, the message indicating that the home access point should or could be changed comprises a message not in accordance with the DHCP protocol.

There is further provided in accordance with an exemplary embodiment of the invention, an access point, comprising an input interface adapted to receive requests for service from client stations, a processor adapted to determine whether a client station requesting service is associated with a different access point and to decide if the client station should re-associate with the access point or remain associated with the different access point.

BRIEF DESCRIPTION OF FIGURES

Particular non-limiting exemplary embodiments of the invention will be described with reference to the following description of embodiments in conjunction with the figures, in which.

DETAILED DESCRIPTION OF EMBODIMENTS

Figure 1:
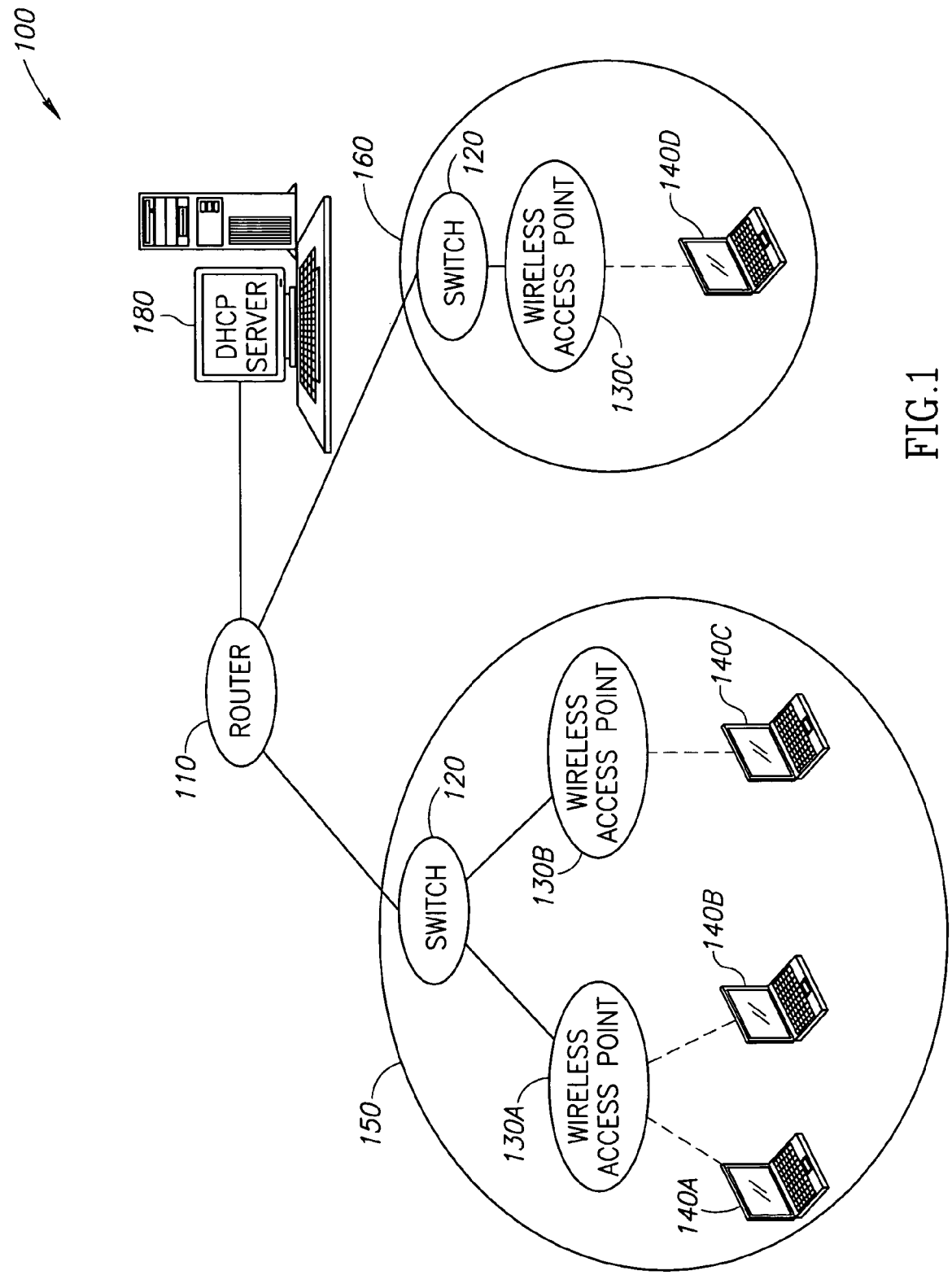
FIG. 1 is an illustration of a network with wireless access points, useful in explaining an exemplary embodiment of the invention.

FIG. 1 is an illustration of a network 100 with wireless access points, useful in explaining an exemplary embodiment of the invention. Network 100 comprises one or more interconnected VLANs (e.g. 150, 160). Each VLAN optionally comprises one or more wireless access points (APs) 130 (marked 130A, 130B and 130C). Access points 130 form the network infrastructure for wireless client stations (STAs) 140 (marked 140A, 140B, 140C and 140D) to connect to the network. An access point (AP) 130 can optionally serve multiple STAs 140.

Typically, one or more of APs 130 are connected together by a hub or switch 120 to allow direct communication between themselves as well as with other VLANs. Additionally, one or more VLANs may be connected together with a router 110 to form a wide area network with other wireless client stations (STAs). In some embodiments of the invention, a server 180 using, for example, the DHCP protocol, allocates IP addresses for STAs 140 upon request. Requests for allocating IP addresses, for example DHCP requests, are forwarded by APs 130 and/or switches 120 to server 180. Server 180 allocates an IP address to STA 140 according to the VLAN to which STA 140 belongs, which is determined according to the specific AP 130 through which the request for the IP address was received.

In some embodiments of the invention, the infrastructure connecting the wireless points is based on standard wire connections. Alternatively or additionally, APs 130 may be interconnected through wireless connections or any other connections.

As mentioned above, as an STA 140 roams from its home AP 130 to other APs 130 in other VLANs of network 100, transmissions to and from STA 140 are tunneled via its home AP 130. In accordance with embodiments of the invention, an attempt is made to have STA 140 change its HAP to be the same as the APs 130 with which it associates.

Figure 2:
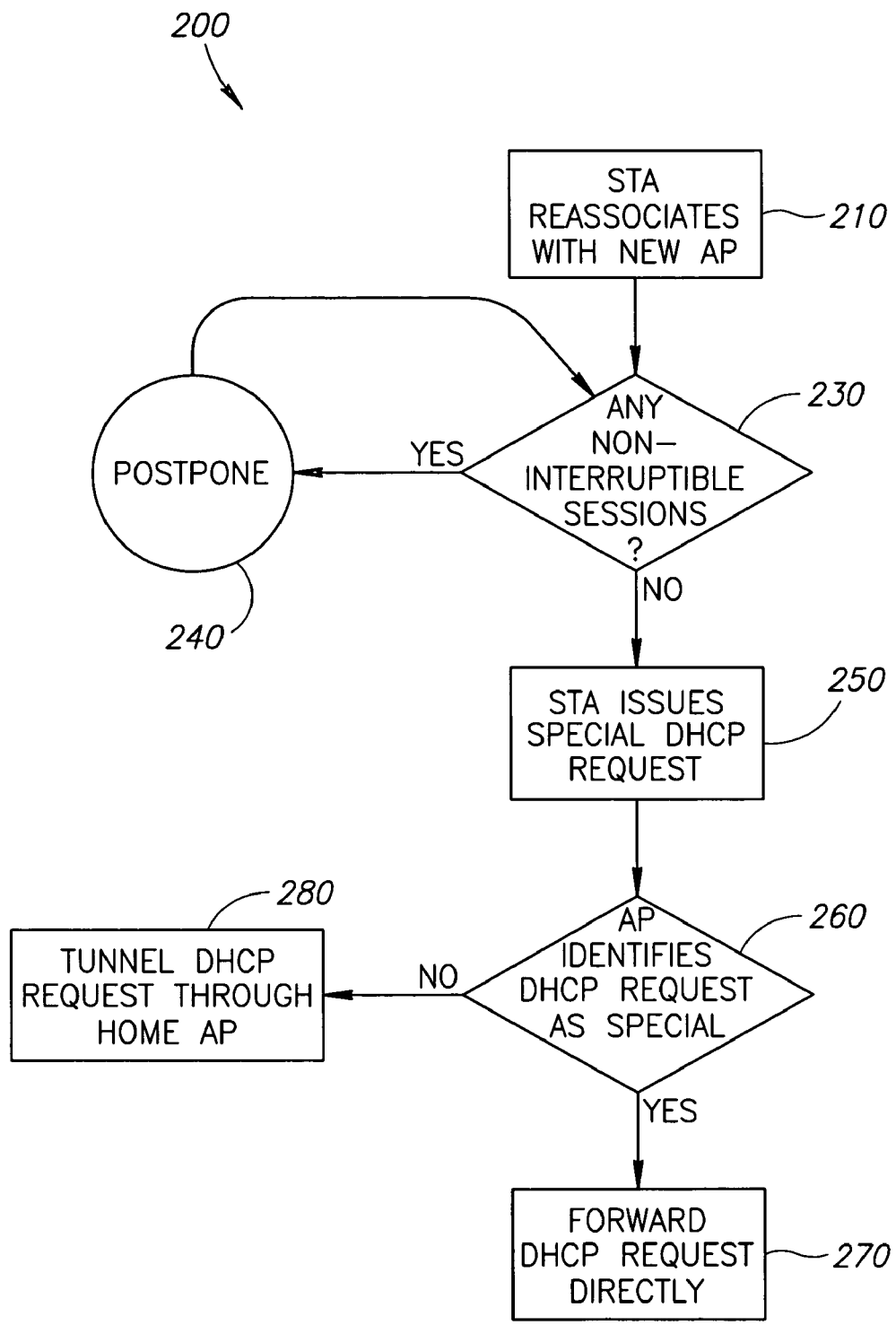
FIG. 2 is a flowchart of a method of reducing tunneling, in accordance with an exemplary embodiment of the present invention.

FIG. 2 is a flow diagram 200 of a process of reducing tunneling by changing the home AP of STAs 140 that reassign to different APs 130, according to an exemplary embodiment of the invention. When an STA 140, whose home access point (HAP) is, for example, 130B, re-associates (210) with a new AP 130C, for example due to movement of STA 140, an upper layer software of STA 140 checks (230) if there are any non-interruptible sessions running on STA 140. The movement of STA 140 may be from the vicinity of AP 130B or any other AP in the network. If (230) STA 140 is conducting a session which cannot be interrupted, the upper layer software of STA 140 will take no action or, stated otherwise, STA 140 will complete the re-association with the new AP 130C, without initiating converting the AP 130C into its home access point (HAP). In some embodiments of the invention, as described hereinbelow, STA 140 will check if there are any non-interruptible sessions at a later time (as indicated in block 240), and if possible will initiate the conversion of the new AP 130C into its home access point (HAP) at that later time.

If STA 140 is not conducting any non-interruptible sessions, STA 140 signals to the new AP 130C, that the new AP 130C should become its new home AP, for example by issuing (250) a special DHCP request. In some embodiments of the invention, a special DHCP which indicates that a new home AP is to be assigned, includes a value of zero in its ciaddr field. Alternatively, any other field of the DHCP request may be used to indicate that the home access point is to be changed.

In some embodiments of the invention, STA 140 transmits a DHCP request each time it connects to a new AP. When there are no non-interruptible sessions a special DHCP request is issued (250), while when there are non-interruptible sessions, a regular DHCP request is transmitted. Alternatively, STA 140 transmits a DHCP request (a special request) only when there are no non-interruptible sessions and a change in the home AP is desired.

In some embodiments of the invention, switch 120 behind AP 130C examines the DHCP requests it receives for forwarding to server 180. If (260) an examined DHCP request includes an indication that the home access point should be changed, the DHCP request is forwarded (270) directly to server 180 and is not tunneled to the home AP 130B of the STA 140. When the DHCP request is received by server 180 directly from the new AP 130C, server 180 assigns STA 140 an IP address corresponding to the new AP (i.e., corresponding to the VLAN of the new AP). As a consequence, current interruptible sessions (e.g., idle sessions) will be disconnected. In some cases the disconnected interruptible sessions are automatically reconnected. Optionally, in order to automatically reconnect the interrupted sessions, STA 140 stores data on each of the active sessions, before transmitting the DHCP request. In contrast, in some cases the user needs to initiate reconnection of the interrupted sessions, if the user so desires.

If (260), however, the DHCP request examined by AP 130 is not special, the request is tunneled (280) by the new AP 130C to the home AP 130B of the STA 140. From the home AP 130B, the DHCP request is forwarded to server 180, which does not change the IP address assigned to the STA 140, since the DHCP request was received from the VLAN of the home access point (HAP) 130B corresponding to the current IP address of the STA 140.

In some embodiments of the invention, when the current AP 130C belongs to the same VLAN as the home AP 130B, DHCP requests are not tunneled through the home AP 130B, regardless of whether they are special. This is because server 180 relates in the same way to DHCP requests from AP 130B and from AP 130C, as they belong to the same VLAN. The VLAN comparison is optionally performed by comparing the VLAN of the home AP as recorded by STA 140 and/or as appears in a central registry of network 100 with the VLAN identity of the new AP 130C as appears in the records of the current AP 130C performing the VLAN check.

Alternatively to performing the VLAN check by AP 130C, the VLAN check is performed by STA 140. If the home AP 130B and the current AP 130C belong to the same VLAN, STA 140 does not transmit a special DHCP request. The data on the VLANs is optionally received from home AP 130B, current AP 130C and/or a central VLAN registry of network 100. Further alternatively, for simplicity and/or in case the VLAN structure may change, STA 140 and AP 130C do not check whether the home AP 130B and the new AP 130C belong to the same VLAN and attempts are made to have the STA 140 associate with the AP 130C from which it receives service, regardless of whether the old and new APs currently belong to a same VLAN.

In some embodiments of the invention, before forwarding the DHCP request to server 180, the special value is converted to a normal value in order to avoid confusion of server 180. Alternatively, a field which is not used by server 180 is used by STA 140 to indicate to AP 130C that the DHCP request is special.

In some embodiments of the invention, the upper layer software that checks whether there are non-interruptible sessions and/or which generates the special DHCP request is actuated by a physical layer of STA 140 which performs the disassociation and the re-association. Alternatively, the software of STA 140 periodically compares the identity of the AP to which it is currently connected to the identity of its home AP. If the access points are not the same, the upper layer software initiates the process of FIG. 2.

In an exemplary embodiment of the invention, a non-interruptible session is a session that will require retransmitting the data if it is interrupted. Alternatively or additionally, a non-interruptible session is a session that is dealing with a critical transmission that cannot be restarted. Further alternatively or additionally, a non-interruptible session is a session that if it is disconnected, the disconnection will be noticed by a human user of the STA 140.

In some embodiments of the invention, the interruptibility of some types of session, for example non real time sessions, is a function of the duration of the session. Optionally, short sessions are considered interruptible as they only just began. Alternatively or additionally, some sessions are considered interruptible if they continue for a relatively long time. In some embodiments of the invention, the definition of non-interruptibility is a function of the application of the session. For example, FTP sessions may be considered interruptible while HTTP sessions are not interruptible.

Optionally, different STAs 140 may have different definitions of non-interruptible sessions based on user preferences and/or quality of service entitlement. Alternatively or additionally, the level of sessions defined as non-interruptible may be adjusted according to the congestion state of the network. For example, when the load on the network is relatively low, re-assignment of the home AP is performed only when it will not be noticed by the user, while when the load is very high re-assignment of the home AP is performed unless it causes disconnection of a real time session.

In an exemplary embodiment of the invention, if the tunneling of the transmissions of a specific STA 140 are heavy on the network, for example, utilizing above a predetermined percentage of the network bandwidth, a higher level of non-interruptibility will be defined for the specific STA 140. Alternatively or additionally, the rate at which the decision not to re-associate the STA 140 with the new AP 130 and/or whether the decision is revisited, depends on the congestion level of the network and/or the bandwidth utilization of the specific STA 140.

As described above, a portion of the method of FIG. 2 is performed by STA 140 and another portion is performed by AP 130. DHCP server 180, however, does not participate in the method of FIG. 2 and does not need to be specifically compatible to operation in accordance with the present invention. As described above, the identification of the movement to a new AP is performed by STA 140, the determination of whether to make the new AP 130C into the home access point (HAP) is performed by STA 140 and the actual forwarding of the message is performed by AP 130C.

In another exemplary embodiment of the invention, AP 130 identifies the movement of STA 140 away from its home AP and instructs STA 140 to perform the determination of whether to make the new AP 130C into the HAP of STA 140. Alternatively, the method of FIG. 2 is performed in its entirety by STAs 140. Optionally, in those embodiments in which network information is needed, STA 140 requests the information from a central network entity. Alternatively or additionally, the network information is periodically broadcast to all APs 130 or to all STAs 140.

In other embodiments of the invention, APs 130 perform the method of FIG. 2. When AP 130 services a STA 140 that is not associated with the AP, the method of FIG. 2 is invoked. Alternatively or additionally, APs 130 periodically review the STAs 140 they are servicing to determine which ones are not associated with the AP. In some embodiments of the invention, when it is determined to change the HAP of the STA 140, AP 130 instructs STA 140 to send the required DHCP request. Alternatively, AP 130 generates the DHCP request, as if it was generated by STA 140. Further alternatively or additionally, AP 130 stops providing service to the STA 140, such that the STA 140 needs to reconnect to the network and receive a new HAP 130.

In some embodiments of the invention, the determination of whether to change the home access point is performed only once, for example when initially associating with a new access point 130. Alternatively, for STAs 140 that are not currently associated with their home APs, STA 140 or AP 130 determine if to change the HAP periodically or every time there is a change in the status of active connections of the STA 140, for example when a connection is terminated. In some embodiments of the invention, a STA 140 keeps track of the frequency in which it roams. A STA 140 that roams frequently will only determine if to change the HAP when roaming, whereas an STA 140 that rarely roams will determine if to change the HAP more frequently. Optionally, when the network configuration changes, such that APs 130 previously in the same VLAN are not in the same VLAN any more, the decisions of whether to change the HAPs of STAs 140 will be revisited.

It is noted that any of the tasks described above as performed by AP 130 may be performed by layer 2 or layer 3 switches servicing APs 130, for example by switches 120. Performing the method by switches 120 without any cooperation from APs 130, which need not be configured to operate in accordance with the present invention, allows planning switches, which are generally simply configured for various tasks, to operate in accordance with the present invention, instead of planning proprietary APs, which are generally less adaptable to changes.

Further alternatively or additionally, some or all of the tasks in accordance with embodiments of the present invention are performed by server 180. For example, server 180 may identify on its own special DHCP requests.

In some embodiments of the invention, instead of limiting each STA 140 to a single IP address, each STA 140 may have two IP addresses. Upon connecting to a new AP 130C, a new IP address is associated with STA 140 and all new connections and optionally interruptible connections are transferred to the new IP address. The non-interruptible sessions optionally continue using the old IP address, until they are all terminated by their applications or become interruptible and are terminated by STA 140. When no connections need the old IP address, the IP address is given back to the pool of the AP which assigned the IP address.

As described above, STAs 140 associate with new APs 130 based on radio criteria regardless of whether the STA has uninterruptible connections. In some embodiments of the invention, however, the decision of whether to change the AP with which the STA 140 is associated takes into account whether the new AP 130 will be able to become the home access point of the STA 140. For example, if there are two possible APs 130 that can be used, if the STA 140 has non-interruptible connections, an AP 130 within the same VLAN as the HAP is preferred. If, however, the STA 140 does not have non-interruptible connections, an AP 130 which has better radio parameters is optionally chosen.

It is noted that although the present invention has been described in relation to the TCP/IP protocol suite, some embodiments of the invention may be implemented with relation to other packet based transmission protocols, such as, for example IPX, DECNET and the ISO protocols.

It will be appreciated that the above described methods may be varied in many ways, including, changing the order of acts, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method comprising:
defining a home access point for a client as a first access point through which the client requests and is assigned a first network address;
determining that the client is being serviced by a second access point different from the home access point;
determining whether the client should change its home access point to the second access point from which the client receives service; and, if determined,
defining the home access point as the second access point; and
assigning a second network address to the client through the second access point.

2. The method of claim 1, wherein determining whether to change the home access point is performed by the client.

3. The method of claim 1, wherein determining whether to change the home access point is performed by the access point servicing the client.

4. The method of claim 1, wherein:
i. determining that the client is being serviced by a second access point is performed automatically without human intervention; and
ii. determining whether the client should change its home access point to the second access point is also performed automatically without human intervention.

5. The method of claim 1, wherein initiating the change comprises transmitting a Dynamic Host Configuration Protocol DHCP request.

6. The method of claim 5, wherein initiating the change comprises transmitting a Dynamic Host Configuration Protocol DHCP request with a field having a value indicating that the home access point could or should be changed.

7. The method of claim 6, wherein a network element along the path from the client to a Dynamic Host Configuration Protocol DHCP server chooses the path in which the DHCP request is forwarded to the DHCP server responsive to the value of the field indicating whether the home access point could or should be changed.

8. The method of claim 7, wherein the network element comprises an access point.

9. The method of claim 7, wherein the network element comprises a layer 2 switch.

10. The method of claim 7, wherein the network element comprises a layer 3 switch.

11. The method of claim 7, wherein the network element comprises a wireless network element.

12. The method of claim 5, wherein the Dynamic Host Configuration Protocol DHCP request is transmitted responsive to a change in the access point servicing the client, regardless of determining whether the client should change its home access point to the second access point, wherein contents of at least one field of the DHCP request is set responsive to the determining whether the client should change its home access point to the second access point.

13. The method of claim 1, wherein initiating the change is performed by stopping the service of the client, in order to force the client to re-connect to the network.

14. The method of claim 1, wherein determining that the client is being serviced by a second access point is performed in response to a change in the access point servicing the client.

15. The method of claim 1, wherein determining that the client is being serviced by a second access point is performed responsive to a change in the network topology.

16. The method of claim 1, wherein determining whether the client should change its home access point to the second access point is performed periodically.

17. The method of claim 1, wherein determining whether the client should change its home access point to the second access point is repeated after a predetermined time if the home access point of the client should not change.

18. The method of claim 1, wherein determining whether the client should change its home access point to the second access point is performed based on the traffic load in a network of the first network address.

19. The method of claim 1, wherein determining whether the client should change its home access point to the second access point is performed based on an analysis of a communication session of the client.

20. The method of claim 19, wherein determining whether the client should change its home access point to the second access point is based on whether none of the sessions of the client are non-interruptible.

21. The method of claim 19, wherein determining whether the client should change its home access point to the second access point is based on whether the client does not have non-idle sessions.

22. The method of claim 19, wherein the determining whether the client should change its home access point to the second access point is based on whether the client does not have active real time sessions.

23. The method of claim 1, wherein the change in the home access point causes all the communication sessions of the client to be disconnected.

24. An apparatus comprising:
a wireless transceiver;
a connection control unit adapted to establish a connection with a specific access unit; and
a processor adapted to decide whether to change a home access point of the client, and to transmit a message indicating that the home access point of the client should be changed, if so decided;
wherein the home access point of the client is an access point through which the client requests and is assigned a network address; and
wherein the message comprises a request for assignment of a network address to the client through a different access point, the different access point becoming the home access point for the client.

25. The apparatus of claim 24, wherein the message indicating that the home access point should or could be changed comprises a Dynamic Host Configuration Protocol DHCP request having a zero value in its ciaddr field.

26. The apparatus of claim 24, wherein the message indicating that the home access point should or could be changed comprises a Dynamic Host Configuration Protocol DHCP request having an indication in a field other than a ciaddr field.

27. The apparatus of claim 24, wherein the message indicating that the home access point should or could be changed comprises a message not in accordance with the Dynamic Host Configuration Protocol DHCP protocol.

28. A method comprising:
assigning a first access point for a client, wherein the first access point is a home access point;
assigning a first network address for the client based on the first access point;
determining a second access point for the client wherein the first access point and the second access point are different;
determining a second network address for the client based on the second access point;
assigning the second network address to the client when the second access point is determined to be the client's home access point.

29. The method of claim 28 wherein the determination of whether the second access point is to be the client's home access point is based on the relative locations of the first access point and the second access point.

30. The method of claim 28 wherein the second network address and the first network address are the same when the client is engaged in a non-interruptible session.

* * * * *

UNITED STATES PATENT AND TRADEMARK OFFICE
CERTIFICATE OF CORRECTION

| | | |
|---|---|---|
| PATENT NO. | : 7,873,012 B2 | Page 1 of 1 |
| APPLICATION NO. | : 10/899418 | |
| DATED | : January 18, 2011 | |
| INVENTOR(S) | : Sadot et al. | |

It is certified that error appears in the above-identified patent and that said Letters Patent is hereby corrected as shown below:

On the Face Page, in Field (56), under "U.S. PATENT DOCUMENTS", in Column 1, Line 5, delete "Saint-Hila et al." and insert -- Saint-Hilaire et al. --, therefor.

On Page 2, in Field (56), under "OTHER PUBLICATIONS", in Column 1, Line 4, delete ", , Publisher:" and insert -- , Publisher: --, therefor at each occurrence throughout the Other Publications.

In Column 3, Line 34, delete "OF FIGURES" and insert -- OF THE FIGURES --, therefor.

In Column 3, Line 47, delete "OF EMBODIMENTS" and insert -- OF THE EMBODIMENTS --, therefor.

In Column 8, Line 38, in Claim 5, delete "DHCP" and insert -- (DHCP) --, therefor.

In Column 8, Line 41, in Claim 6, delete "DHCP" and insert -- (DHCP) --, therefor.

In Column 8, Line 45, in Claim 7, delete "DHCP" and insert -- (DHCP) --, therefor.

In Column 8, Line 58, in Claim 12, delete "DHCP" and insert -- (DHCP) --, therefor.

In Column 9, Line 30, in Claim 22, delete "wherein the" and insert -- wherein --, therefor.

In Column 10, Line 11, in Claim 25, delete "DHCP" and insert -- (DHCP) --, therefor.

In Column 10, Line 15, in Claim 26, delete "DHCP" and insert -- (DHCP) --, therefor.

In Column 10, Line 20, in Claim 27, delete "DHCP" and insert -- (DHCP) --, therefor.

Signed and Sealed this
Twenty-seventh Day of November, 2012

David J. Kappos
*Director of the United States Patent and Trademark Office*